United States Patent
Zhang

(10) Patent No.: US 7,403,665 B2
(45) Date of Patent: Jul. 22, 2008

(54) DEBLOCKING METHOD AND APPARATUS USING EDGE FLOW-DIRECTED FILTER AND CURVELET TRANSFORM

(75) Inventor: Zhi-ming Zhang, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 469 days.

(21) Appl. No.: 11/159,116

(22) Filed: Jun. 23, 2005

(65) Prior Publication Data

US 2005/0286795 A1    Dec. 29, 2005

Related U.S. Application Data

(60) Provisional application No. 60/581,758, filed on Jun. 23, 2004.

(30) Foreign Application Priority Data

Sep. 7, 2004    (KR) .................. 10-2004-0071220

(51) Int. Cl.
*G06K 9/46*    (2006.01)
(52) U.S. Cl. ..................... 382/244; 382/240
(58) Field of Classification Search .......... 382/260, 382/240–244
See application file for complete search history.

(56) References Cited

U.S. PATENT DOCUMENTS

| | | | | |
|---|---|---|---|---|
| 6,678,421 B1* | 1/2004 | Daniell et al. | ............... | 382/240 |
| 7,054,367 B2* | 5/2006 | Oguz et al. | ............ | 375/240.23 |
| 2003/0142750 A1* | 7/2003 | Oguz et al. | ............ | 375/240.18 |
| 2005/0013494 A1* | 1/2005 | Srinivasan et al. | .......... | 382/233 |
| 2006/0188013 A1* | 8/2006 | Coimbra et al. | .......... | 375/240.2 |

* cited by examiner

*Primary Examiner*—Jingge Wu
*Assistant Examiner*—Tsung-Yin Tsai
(74) *Attorney, Agent, or Firm*—Staas & Halsey LLP

(57) ABSTRACT

A deblocking method and apparatus using an edge flow-directed filter and curvelet transform for deblocking Block Discrete Cosine Transform (BDCT) compressed images. The deblocking method includes: extracting an edge flow vector from a Block Discrete Cosine Transform (BDCT) compressed image to identify a direction of changes in image attributes; performing a dyadic discrete wavelet transform on the BDCT compressed image; selectively filtering a highpass wavelet image among dyadic discrete wavelet transform compressed images according to an edge flow direction of an edge pixel; performing a curvelet transform on an image including the selectively filtered highpass wavelet image and wavelet images other than the highpass wavelet image; and estimating an original image before being BDCT compressed using the curvelet transform.

20 Claims, 8 Drawing Sheets

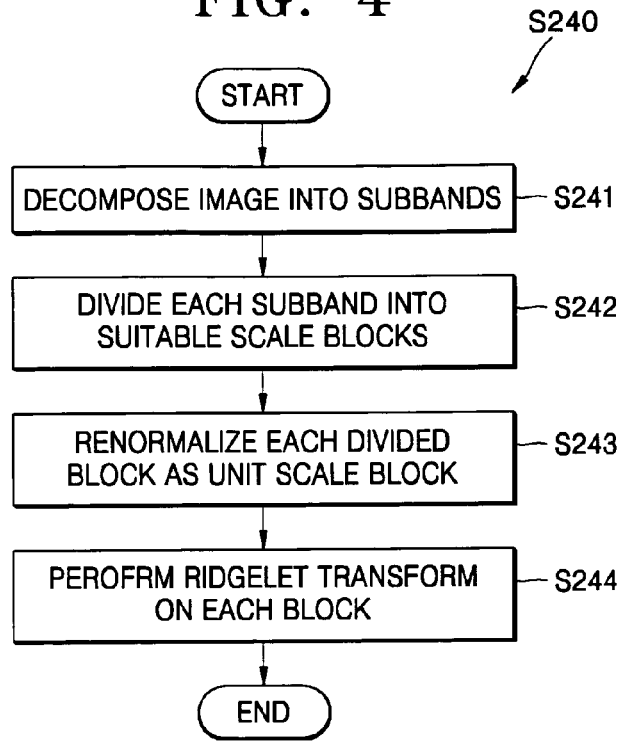
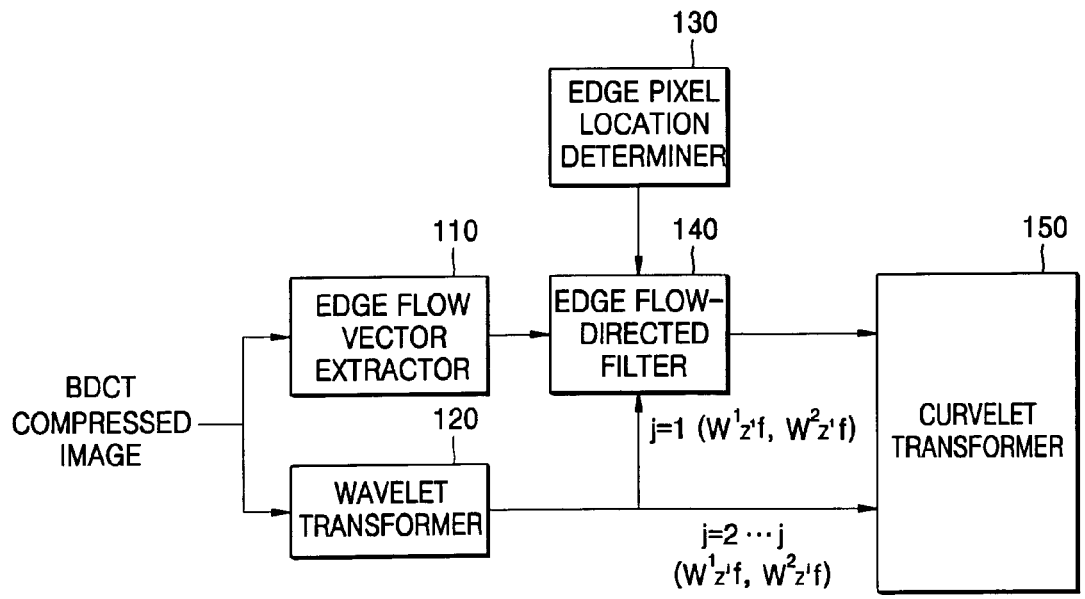

DEBLOCKING METHOD AND APPARATUS USING EDGE FLOW-DIRECTED FILTER AND CURVELET TRANSFORM

CROSS-REFERENCE TO RELATED APPLICATIONS

This application claims the priority of U.S. Application No. 60/581,758, filed on Jun. 23, 2004, and Korean Patent Application No. 10-2004-0071220, filed on Sep. 7, 2004, the disclosures of which are incorporated herein by reference.

BACKGROUND OF THE INVENTION

1. Field of the Invention

The present invention relates to deblocking of compressed images, and more particularly, to a method of and apparatus for deblocking Block Discrete Cosine Transform compressed images based on an edge flow-directed filter and curvelet transform.

2. Description of Related Art

Block Discrete Cosine Transform (BDCT) is widely used to define a standard for encoding still images such as Joint Photographic Experts Group (JPEG), Motion Picture Experts Group (MPEG), H.263, etc., and motion pictures. In BDCT, an image is divided into blocks, which are separately compressed irrespective of correlations between the blocks. In this regard, since a Discrete Cosine Transform (DCT) is used to compress an 8x8 block or 16x16 block, block compression at a low bit rate results in a remarkable discontinuity across block boundaries, which is called a blocking artifact.

Various techniques for removing blocking artifacts have been studied. One such technique is post-processing, which processes an image after a decoder regardless of a compressor/decompressor (codec) structure, is divided into an image reinforcement method and image restoration method.

The image reinforcement method removes blocking artifacts by properly filtering block boundaries using a filter. The image restoration method restores a decoded image using a Maximum A Posteriori (MAP), or a Projection Onto Convex Sets (POCS).

Some efficient deblocking methods using wavelet representation have been proposed. However, these methods may not be suitable for images containing a large portion of texture. An adaptive method for determining the soft threshold and different threshold values and strategies has been used for determining the wavelet coefficients at different high frequency subbands, but it had less peak signal-to-noise ratio (PSNR) improvements compared to a POCS-based method. And it also shows that compactly supported wavelets can lead to many visual artifacts when used in conjunction with non-linear processing, particularly for decimated wavelet used at critical sampling.

BRIEF SUMMARY

An aspect of the present invention provides a deblocking method and apparatus using an edge flow-directed filter and curvelet transform to protect edge information in a compressed image and smooth noise in a background region.

According to an aspect of the present invention, there is provided a deblocking method using an edge flow-directed filter and curvelet transform, the deblocking method comprising: extracting an edge flow vector from a Block Discrete Cosine Transform (BDCT) compressed image to identify a direction of changes in image attributes; performing a dyadic discrete wavelet transform on the BDCT compressed image; selectively filtering a highpass wavelet image among dyadic discrete wavelet transform compressed images according to an edge flow direction of an edge pixel; performing a curvelet transform on an image including the selectively filtered highpass wavelet image and wavelet images other than the highpass wavelet image; and estimating an original image before being BDCT compressed using the curvelet transform.

According to another aspect of the present invention, there is provided a deblocking apparatus using an edge flow-directed filter and curvelet transform, the deblocking apparatus comprising: an edge flow vector extractor extracting an edge flow vector from a BDCT compressed image to identify a direction of changes in image attributes; a wavelet transformer performing a dyadic discrete wavelet transform on the BDCT compressed image; an edge pixel location determiner determining a location of an edge pixel on the edge flow boundary only relating to a highpass wavelet image among compressed images transformed by the wavelet transformer; an edge flow-directed filter selectively filtering the highpass wavelet image according to results of the edge pixel location determiner; and a curvelet transformer performing curvelet transform on an image including the selectively filtered highpass wavelet image and wavelet images other than the highpass wavelet image.

According to still another aspect of the present invention, there is provided a computer readable medium having embodied thereon a computer program for executing the above-described method.

Additional and/or other aspects and advantages of the present invention will be set forth in part in the description which follows and, in part, will be obvious from the description, or may be learned by practice of the invention

BRIEF DESCRIPTION OF THE DRAWINGS

These and/or other aspects and advantages of the present invention will become apparent and more readily appreciated from the following detailed description, taken in conjunction with the accompanying drawings of which:

FIG. 4 is a flowchart of a curvelet transform method according to an embodiment of the present invention;

FIG. 5 is a schematic diagram illustrating a deblocking apparatus using an edge flow-directed filter and curvelet transform according to an embodiment of the present invention;

DETAILED DESCRIPTION OF EMBODIMENTS

Figure 1A:
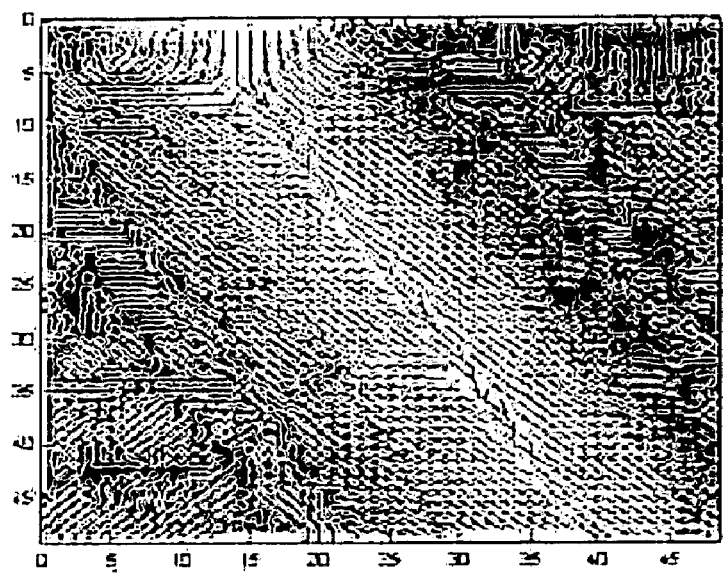
FIGS. 1A through 1D are photos showing images with edge flow fields and edge flow map boundaries.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1B:
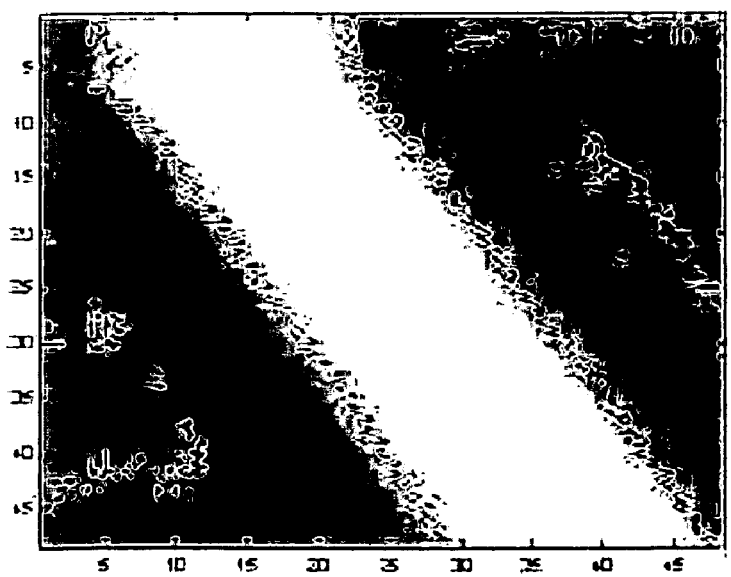
Figure 1C:
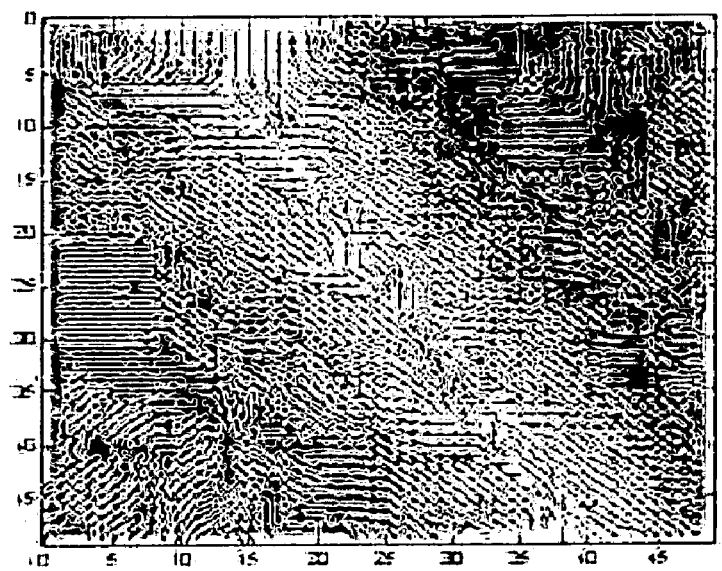
Figure 1D:
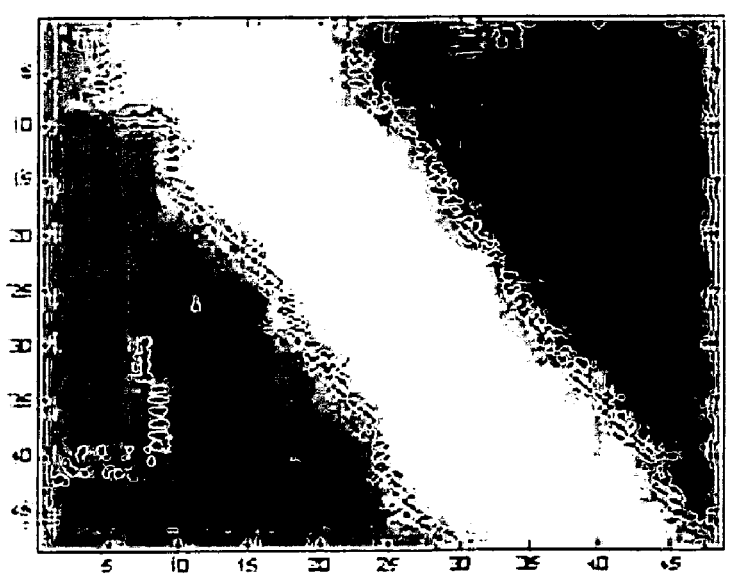

FIGS. 1A through 1D are photos showing images with edge flow fields and edge flow map boundaries. FIG. 1A is an original "Lena" image with an edge flow field; FIG. 1B is a result of a boundary map after edge flow propagation; FIG. 1C is a compressed image with an edge flow field; and FIG. 1D is a result of boundary map after edge flow propagation. For clarity, only a part of the full image is shown in each case.

The curvelet transform was developed to obtain only a few coefficients either for the smooth parts or the edge parts, so that the balance between parsimony and accuracy of the image will be much more favorable and a lower mean squared error (MSE) will result. While the Gaussian assumption is not valid for the quantization noise, it is known that such noise is structured around block boundaries. So the deblocking problem simply reduces to smoothing out discontinuities across block boundaries only in smooth background regions while protecting edges that might occur at block boundaries. Given the edge and texture information, which are provided by the following edge flow method, curvelet representations are well suited for deblocking of BDCT compressed images.

An edge flow vector is utilized to identify and integrate the direction of changes in image attributes at each image location. The magnitude of represents the total edge energy and points in the direction of finding the closest boundary pixel. By propagating the edge flow vectors, the boundaries can be detected at image boundaries, which encounter two opposite directions of "flow" in the stable state. FIGS. 1A through 1D show some examples. It can be seen that under the edge flow representation, edge flow vectors always show similar directions within the smoothing texture zones.

As shown in FIGS. 1C and 1D, most of the edge flow vectors still get the right texture assembly and do not go along with the 8×8 blocking edges even if the image has been highly BDCT compressed. Thus, the spatial-domain-like filter can be used to infer the boundary coefficients according to the edge flow direction. Such kind of directional smoothing filter can protect the edges from blurring while smoothing.

Also, the 2-D filter is applied in the wavelet domain here because a 2-D wavelet transform of image exhibits large coefficients along the important edges, and an edge flow-directed filter will not smooth the texture as much as in the spatial domain.

Figure 2:
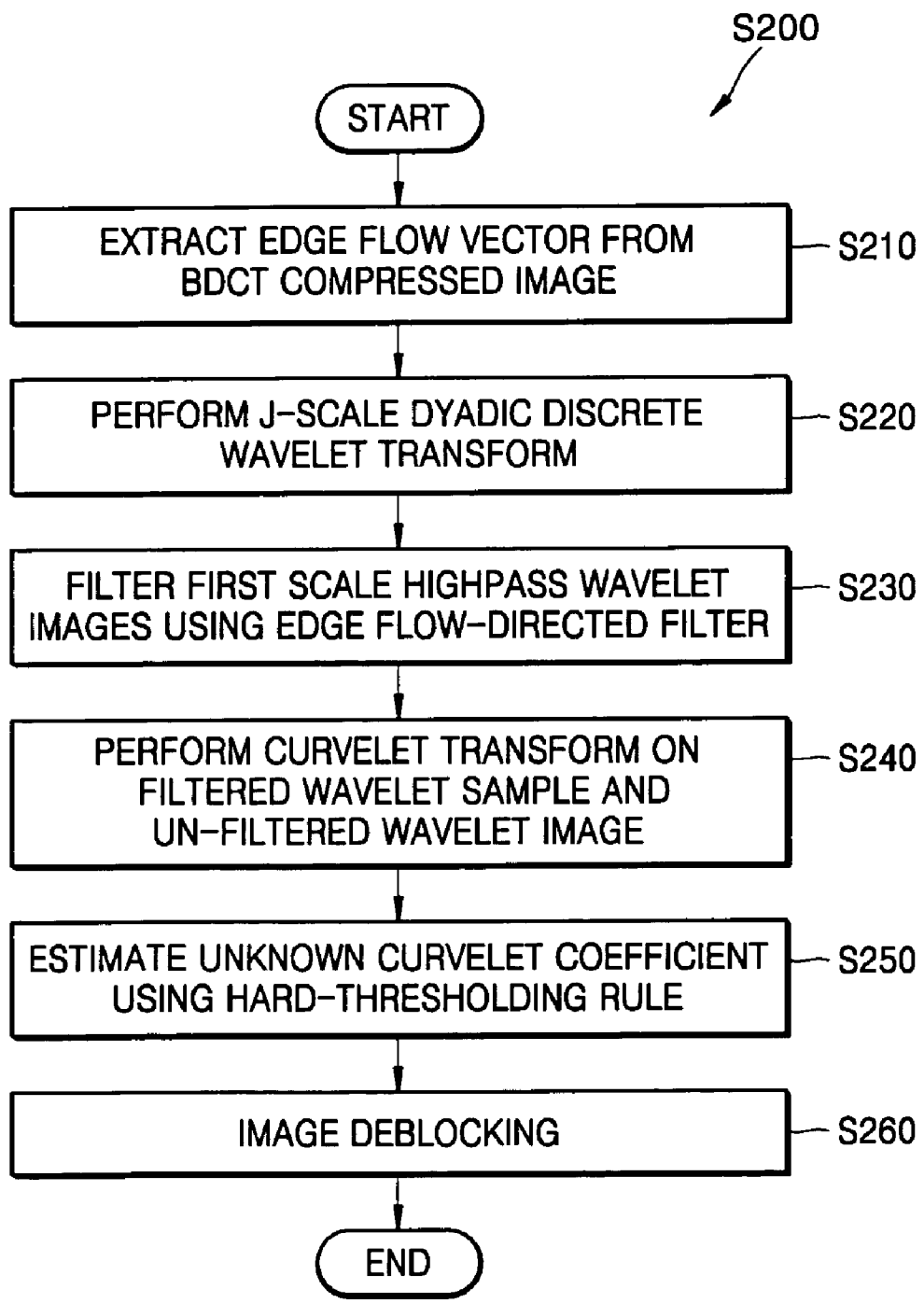
FIG. 2 is a flowchart of a deblocking method using an edge flow-directed filter and curvelet transform according to an embodiment of the present invention.

FIG. 2 is a flowchart S200 describing a deblocking method using the edge flow-directed filter and curvelet transform according to an embodiment of the present invention.

In order to identify the direction of changes in image attributes, an edge flow vector is extracted from a BDCT compressed image (Operation S210).

Assuming f(x,y) is a given compressed image (a BDCT compressed image in the present embodiment) of size N×N. Edge flow information is extracted by directly using an intensity edge flow method. To simplify the computation of the edge flow, the angle of edge flow vector $\vec{F}(x,y)$ is quantized into steps of $\pi/4$. Further, based on $\vec{F}(x,y)$, the edge flow boundary map E(x,y) can be obtained, where E(x,y)=1 means f(x,y) is an edge pixel, and E(x,y)=0 means f(x,y) belongs to a background region.

A J-scale dyadic discrete wavelet transform is done on the BDCT compressed image (Operation S220). The J-level overcomplete 2-D wavelet representation of f(x,y), $W_{2^j}^1 f$ and $W_{2^j}^2 f$, is obtained. Here, with the edge flow boundary map E(x,y) at hand, C={(x,y)|E(x,y)=1} and $N_w$ is defined as the number of non-zero elements in E(x,y). Then the threshold $T_j^w$ for scale j is defined as:

$$T_j^w = \left[\sum_{(x,y)\in C}\sum (|W_{2^j}^1 f|^2 + |W_{2^j}^2 f|^2)\right] / (N_w \times N \times N). \quad (1)$$

Then, only first scale highpass wavelet images $W_{2^j}^1 f$ and $W_{2^j}^2 f$ from the J-scale dyadic discrete wavelet transform compressed images are filtered using the edge flow-directed filter (Operation S230). The weights of a filter kernel are changed according to the edge flow direction of an edge pixel in the edge flow-directed filter. Taking a J-scale dyadic discrete wavelet transform of a BDCT compressed image, the blockiness in f(x,y) has a strong showing in the first scale highpass wavelet images $W_{2^j}^1 f$ and $W_{2^j}^2 f$, which are only filtered.

Operation S230 will be described in detail with reference to FIG. 3.

The curvelet transform is done on an image having the filtered wavelet image and un-filtered wavelet image (i.e., wavelet image other than the first scale highpass wavelet images) (Operation S240). Operation S240 will be described in detail with reference to FIG. 4.

Then, a curvelet coefficient is estimated using the hard-thresholding rule (Operation S250). The curvelet coefficient is an original image with noise removed before being BDCT compressed.

If d is the noisy curvelet coefficients, the prediction will be:

$$\hat{d}=d \text{ If } |d|\geq T; \text{ and} \quad (2)$$

$$\hat{d}=0 \text{ If } |d|<T. \quad (3)$$

The performance of the deblocking algorithm depends on the threshold T in (2)(3), which should be set as the variable of BDCT quantization noise. Since the correct value of T is not known a priori, it is estimated by using the following experimental equation:

$$T=\lambda_1^j \cdot \lambda_2^j \cdot T_w^j, \quad (4)$$

where $\lambda_1^j$ is related to quantization matrix and $\lambda_2^j$ is the coefficient which is mainly determined by the size of blocking ridgelet transform.

Image deblocking is performed using the obtained curvelet coefficient (Operation S260). To this end, an inverse curvelet transform is performed. That is, an inverse ridgelet transform and inverse wavelet transform are done on the estimated original image before being BDCT compressed, thereby resulting in a deblocked image.

The deblocked image can be reconstructed by cascading the following operation from scale J up to the original scale.

Figure 3:
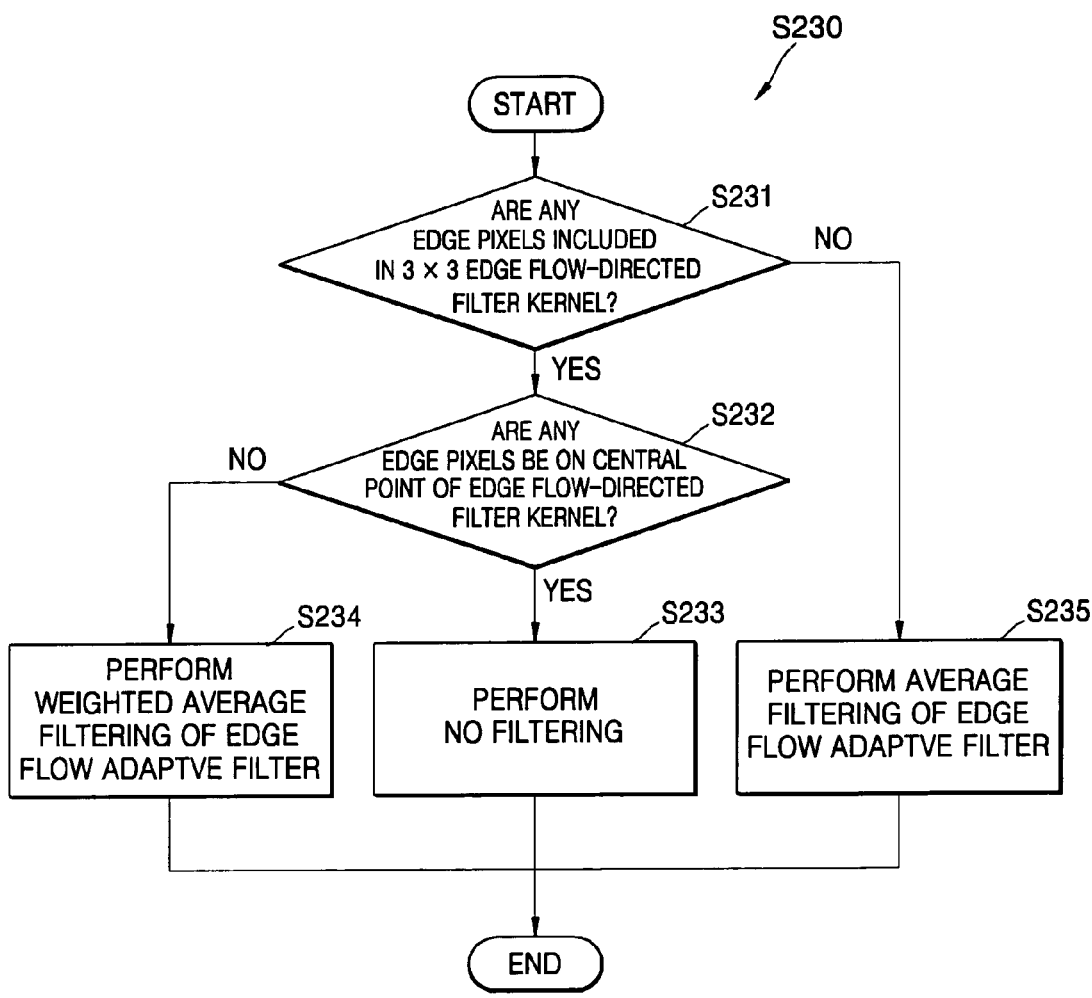
FIG. 3 is a flowchart of an edge flow-directed filtering method according to an embodiment of the present invention.

FIG. 3 is a flowchart S230 describing an edge flow-directed filtering method according to an embodiment of the present invention.

It is determined if an edge pixel of an edge flow boundary is included in a 3×3 edge flow-directed filter kernel (Operation S231).

If the edge pixel of the edge flow boundary is not included in the 3×3 edge flow-directed filter kernel, an average filtering is performed (Operation S235). If the edge pixel of the edge flow boundary is included in the 3×3 edge flow-directed filter kernel, it is determined if the edge pixel of the edge flow boundary are on the central point of the 3×3 edge flow-directed filter kernel (Operation S232).

If the edge pixel of the edge flow boundary is at the central point E(x,y)=1 of the 3×3 edge flow-directed filter kernel, no filtering operation is performed (Operation S233). If not, a weighted average filtering is performed (Operation S234).

The processed pixel represents an edge pixel that means the existence of the statistically different regions and so any further smoothing will blur the corresponding edges.

As described above, if the edge pixel of the edge flow boundary is not included in the 3×3 edge flow-directed filter kernel, the average filtering is performed in Operation S235. When the edge flow matrix covered by filter kernel is $\vec{F}(x,y)$, $0 \leq x,y \leq 2$ and $\vec{F}(1,1)$ is the center point of the matrix. Then the actual weights in the filter kernel is calculated as:

$$\text{Kernel}(x,y) = K1(x,y) \cdot |\vec{F}(x,y)| \cdot |\vec{F}(1,1)| \cdot \{1 + \cos[\text{angle}(\vec{F}(x,y)) - \text{angle}(\vec{F}(1,1))]\}, \quad (5)$$

where angle($\vec{F}(x,y)$) is the angle of vector $\vec{F}(x,y)$ and $\|\ \|$ means module. Kernel matrix K1 is given by $$K1 = \begin{bmatrix} 0.5 & 1 & 0.5 \\ 1 & 2 & 1 \\ 0.5 & 1 & 0.5 \end{bmatrix}.$$

If the edge pixel of the edge flow boundary is on the 3×3 edge flow-directed filter kernel except the central point, the weighted average filtering is performed in Operation S234 using the same equation as (5) but kernel matrix K1 is replaced as K2:

$$K2 = \begin{bmatrix} 0 & 1 & 0 \\ 1 & 4 & 1 \\ 0 & 1 & 0 \end{bmatrix}.$$

As noted the weights of the filter kernel are changed according to the edge flow direction of the edge pixel in the filter kernel to protect image details from being corrupted and to maintain details continuity.

While the 3×3 edge flow-directed filter kernel is used, however, it is to be understood that the size of the filter kernel is not limited thereto.

FIG. 4 is a flowchart S240 describing a curvelet transform method according to an embodiment of the present invention.

An image having the filtered wavelet image and unfiltered wavelet image (i.e., wavelet image other than the first scale highpass wavelet image) is decomposed in subbands (Operation S241).

Each of the subbands is divided into suitable scale blocks (Operation S242). Each of the divided blocks is renormalized as a unit scale block (Operation S243). Then, each block is analyzed through a discrete ridgelet transform (Operation S244).

In another embodiment of the present invention, for filtered wavelet samples $\tilde{W}_{2^j}^1 f$ and $\tilde{W}_{2^j}^2 f$ and unfiltered wavelet images $W_{2^j}^1 f$ and $W_{2^j}^2 f$ ($2 \leq i \leq J$), such N×N wavelet images are further decomposed into smoothly overlapping blocks of sidelength $B_j$ pixels in such a way that overlap between two vertically adjacent blocks is a rectangular array of size $B_j$ by $B_j/2$. For an N×N image, $2N/B_j$ such blocks are counted in each direction and digital ridgelet transform are done on each block.

FIG. 5 is a schematic diagram illustrating a deblocking apparatus using the edge flow-directed filter and curvelet transform according to an embodiment of the present invention. Referring to FIG. 5, the deblocking apparatus has an edge flow vector extractor 110, wavelet transformer 120, edge pixel location determiner 130, edge flow-directed filter 140, and curvelet transformer 150.

The edge flow vector extractor 110 extracts an edge flow vector from a BDCT compressed image in order to identify the direction of changes in image attributes.

The wavelet transformer 120 performs a dyadic discrete wavelet transform on the BDCT compressed image.

The edge pixel location determiner 130 determines a location of an edge pixel on the edge flow boundary only relating to a first scale highpass wavelet image among compressed images transformed by the wavelet transformer 120.

The edge flow-directed filter 140 does not perform filtering according to results of the edge pixel location determiner 130, or performs an average filtering or weighted average filtering by changing weights of a filter kernel. The weights of the filter kernel are calculated using equation (5) and kernel matrix K1 and K2.

The curvelet transformer 150 performs curvelet transform on wavelet image filtered by the edge flow-directed filter 140 and unfiltered wavelet image (i.e., wavelet image other than the first scale highpass wavelet image).

The deblocking apparatus may comprise an inverse curvelet transformer to perform inverse curvelet transform on an original image before being BDCT compressed which will be estimated by a curvelet coefficient estimator.

Figure 6:
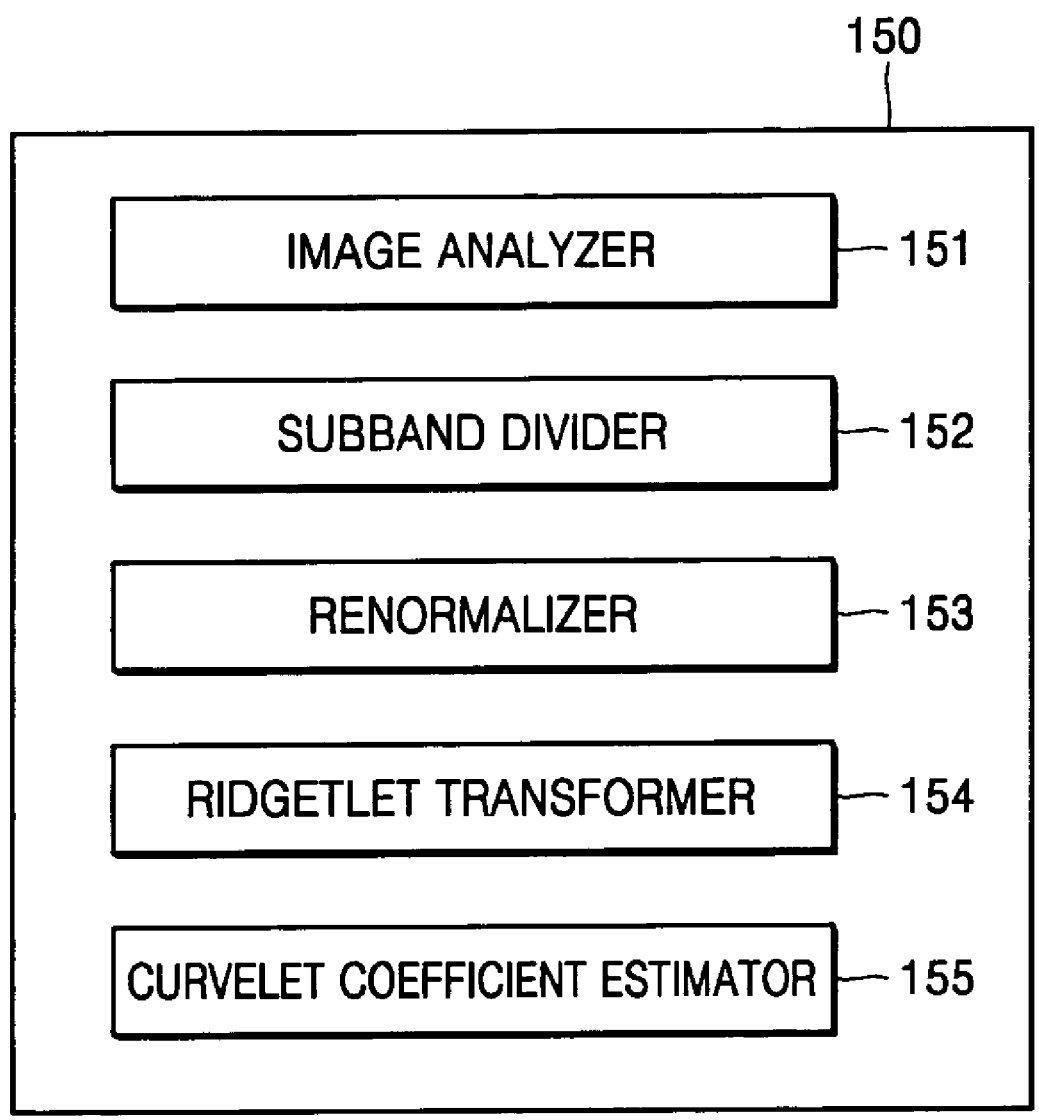
FIG. 6 is a schematic diagram illustrating a curvelet transformer according to an embodiment of the present invention.

FIG. 6 is a schematic diagram illustrating the curvelet transformer 150 of FIG. 3. Referring to FIG. 6, the curvelet transformer 150 has an image analyzer 151, subband divider 152, renormalizer 153, ridgelet transformer 154, and curvelet coefficient estimator 155.

The image analyzer 151 decomposes an image having the filtered wavelet image by the edge flow-directed filter and unfiltered wavelet image in subbands.

The subband divider 152 divides each of the subbands into a suitable scale block. The renormalizer 153 renormalizes each of the divided blocks as a unit scale block.

The ridgelet transformer 154 performs discrete ridgelet transform in order to analyze each block.

The curvelet coefficient estimator 155 estimates the original image before being BDCT compressed. In the present embodiment, the hard-thresholding rule is used to estimate curvelet coefficients.

FIGS. 7A through 7F are photos showing an original, a BDCT compressed, and a deblocked image of "Lena" (7A, 7B, 7C) and "Babara" (7D, 7E, 7F).

Figure 7A:
FIGS. 7A through 7F are photos showing an original, a BDCT compressed, and a deblocked image of "Lena" (7A, 7B, 7C) and "Babara" (7D, 7E, 7F).
Figure 7B:
Figure 7C:
Figure 7D:
Figure 7E:
Figure 7F:

Extensive deblocking experiments using images with different characteristics have been performed. For illustration, the deblocking results for the 512×512 images "Lena" and "Barbara" are shown. Three JPEG quantization tables are used to compress images. "Lena" contains mainly smooth region while "Barbara" contains regular texture pattern on her garment. Set maximum scale J=3. $(\lambda_1^1, \lambda_1^2, \lambda_1^3)$ is (0.5,0.5, 0.25) for quantization table Q1, (0.5,0.5,0.5) for Q2 and (1.0, 0.75,0.75) for Q3. $(\lambda_2^1, \lambda_2^2, \lambda_2^3)$ is (256,32,32) for all the quantization tables. And block size for curvelet transform is 32×32 for scale 1 and 64×64 for scale 2 and 3. FIGS. 7A and 7D show, respectively, the original "Lena" and "Barbara"; FIGS. 7B and 7E show, respectively, BDCT compressed "Lena" and "Barbara" (using Q2) with blocking artifacts; and FIGS. 7C and 7F show, respectively, the deblocked "Lena" and "Barbara" using the method according to an embodiment of the present invention.

TABLE 1

Deblocking results for the images

| | Lena | | | Barbara | | |
|---|---|---|---|---|---|---|
| | Quant. | | | | | |
| | Q1 | Q2 | Q3 | Q1 | Q2 | Q3 |
| Test Image | 30.702 | 30.091 | 27.382 | 25.939 | 25.591 | 24.028 |
| WDx | 31.215 | 30.758 | 28.315 | 25.226 | 25.070 | 24.100 |
| WDa | 31.602 | 31.187 | 28.654 | 26.274 | 25.973 | 24.560 |
| WSD | 31.299 | 30.696 | 27.894 | 24.652 | 24.544 | 23.631 |
| MPEG4 | 31.211 | 30.694 | 28.095 | 26.092 | 25.774 | 24.367 |
| POCSp | 31.629 | 31.020 | 28.513 | 26.638 | 26.316 | 24.733 |
| POCSy | 31.314 | 30.741 | 28.294 | 26.399 | 26.051 | 24.449 |
| Present Embodiment | 31.785 | 31.240 | 28.679 | 26.860 | 26.541 | 25.067 |

In Table 1, WDx stands for Xiong's wavelet deblocking algorithm; WDa stands for Alan's overcomplete wavelet deblocking algorithm; WSD stands for Hsung's wavelet singularity detection algorithm; MPEG4 stands for MPEG-4 VM postfiltering algorithm; POCSp stands for Paek's POCS algorithm; and POCSy stands for Yang's spatially adaptive POCS algorithm. The BDCT compressed "Lena" and "Barbara" in FIG. 7 has a peak signal-to-noise ratio (PSNR) of 30.091 dB and 25.591 dB, respectively, whereas the deblocked image has a PSNR of 31.240 dB and 26.541 dB.

The PSNR results for the performance comparison between the deblocking method and different algorithms are shown in Table 1. It can be seen that the deblocking method outperforms other algorithms in PSNR. While the algorithm in Wda got good results for "Lena", it is unable to perform well for the "Barbara" image that contains a large portion of texture. The deblocking method has good results for both "Lena" and "Barbara".

The deblocking method and apparatus using the edge flow-directed filter and curvelet transform of the above-described embodiments of the present invention can smooth out blocking artifacts while preserving edges and textural information, and retain sharp features in the images and compared with other wavelet-based methods, achieve the higher PSNR improvement.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A deblocking method using an edge flow-directed filter and curvelet transform, comprising:
   extracting an edge flow vector from a Block Discrete Cosine Transform (BDCT) compressed image to identify a direction of changes in image attributes;
   performing a dyadic discrete wavelet transform on the BDCT compressed image;
   selectively filtering a highpass wavelet image among dyadic discrete wavelet transform compressed images according to an edge flow direction of an edge pixel;
   performing a curvelet transform on an image including the selectively filtered highpass wavelet image and wavelet images other than the highpass wavelet image; and
   estimating an original image before being BDCT compressed using the curvelet transform.

2. The deblocking method of claim 1, wherein the highpass wavelet image is not filtered according to the edge flow direction, or is filtered using the edge flow-directed filter where weights of a filter kernel are changed.

3. The deblocking method of claim 2, wherein the selectively filtering includes:
   performing no filtering when an edge pixel of an edge flow boundary is at a central point of the filter kernel of the edge flow-directed filter;
   performing an average filtering when the edge pixel of the edge flow boundary is not included in the filter kernel of the edge flow-directed filter; and
   performing a weighted average filtering when the edge pixel of the edge flow boundary is in the filter kernel of the edge flow-directed filter except on the central point.

4. The deblocking method of claim 3, wherein weights of the filter kernel used to perform the average filtering are calculated as:

$$\text{Kernel}(x,y) = K1(x,y) \cdot |\vec{F}(x,y)| \cdot |\vec{F}(1,1)| \cdot \{1 + \cos[\text{angle}(\vec{F}(x,y)) - \text{angle}(\vec{F}(1,1))]\}$$

wherein an edge flow matrix covered by the filter kernel is $\vec{F}(x,y)$, $0 \leq x,y \leq 2$, $\vec{F}(1,1)$ is the center point of the matrix, $\text{angle}(\vec{F}(x,y))$ is the angle of vector $\vec{F}(x,y)$, and kernel matrix K1 is given by $$K1 = \begin{bmatrix} 0.5 & 1 & 0.5 \\ 1 & 2 & 1 \\ 0.5 & 1 & 0.5 \end{bmatrix}.$$

5. The deblocking method of claim 3, wherein weights in the filter kernel used to perform the weighted average filtering are calculated as:

$$\text{Kernel}(x,y) = K1(x,y) \cdot |\vec{F}(x,y)| \cdot |\vec{F}(1,1)| \cdot \{1 + \cos[\text{angle}(\vec{F}(x,y)) - \text{angle}(\vec{F}(1,1))]\}$$

wherein the edge flow matrix covered by the filter kernel is $\vec{F}(x,y)$, $0 \leq x,y \leq 2$, $\vec{F}(1,1)$ is the center point of the matrix, $\text{angle}(\vec{F}(x,y))$ is the angle of vector $\vec{F}(x,y)$, and kernel matrix K2 is given by $$K2 = \begin{bmatrix} 0 & 1 & 0 \\ 1 & 4 & 1 \\ 0 & 1 & 0 \end{bmatrix}.$$

6. The deblocking method of claim 1, wherein only a first scale highpass wavelet image among the dyadic discrete wavelet transform compressed images is selectively filtered according to the edge flow direction of the edge pixel.

7. The deblocking method of claim 1, wherein the performing of the curvelet transform includes:
   decomposing an image including the filtered wavelet image and unfiltered wavelet images into subbands;
   dividing each of the subbands into suitable scale blocks;
   renormalizing the divided blocks as a unit scale block; and
   analyzing each block through a discrete ridgelet transform.

8. The deblocking method of claim 7, wherein the blocks overlap between two vertically adjacent blocks.

9. The deblocking method of claim 1, wherein the original image before being BDCT compressed is estimated using the following hard-thresholding rule, $$\hat{d} = d \text{ If } |d| \geq T,$$

$$\hat{d} = 0 \text{ If } |d| < T, \text{ and}$$

$$T = \lambda_1^j \cdot \lambda_2^j \cdot T_w^j,$$

wherein d is the noisy curvelet coefficients, $\lambda_1^j$ is related to quantization matrix and $\lambda_2^j$ is the coefficient which is mainly determined by the size of the following blocking ridgelet transform, $$T_j^w = \left[\sum_{(x,y)\in C}\sum\left(|W_{2j}^1 f|^2 + |W_{2j}^2 f|^2\right)\right] / (N_w \times N \times N),$$

and
wherein C={(x,y)|E(x,y)=1} and $N_w$ is defined as the number of non-zero elements in E(x,y).

10. The deblocking method of claim 1, further comprising performing inverse curvelet transform on the estimated original image.

11. A deblocking apparatus using an edge flow-directed filter and curvelet transform, comprising:
  an edge flow vector extractor extracting an edge flow vector from a BDCT compressed image to identify a direction of changes in image attributes;
  a wavelet transformer performing a dyadic discrete wavelet transform on the BDCT compressed image;
  an edge pixel location determiner determining a location of an edge pixel on the edge flow boundary only relating to a highpass wavelet image among compressed images transformed by the wavelet transformer;
  an edge flow-directed filter selectively filtering the highpass wavelet image according to results of the edge pixel location determiner; and
  a curvelet transformer performing curvelet transform on an image including the selectively filtered highpass wavelet image and wavelet images other than the highpass wavelet image.

12. The deblocking apparatus of claim 11, wherein the edge flow-directed filter does not perform filtering according to results of the edge pixel location determiner, or performs filtering by changing weights of the filter kernel.

13. The deblocking apparatus of claim 12, wherein the edge flow-directed filter performs no filtering when an edge pixel of an edge flow boundary is on a central point of filter kernel of the edge flow-directed filter, performs an average filtering when the edge pixel of the edge flow boundary are not included in the filter kernel of the edge flow-directed filter, and performs a weighted average filtering when the edge pixel of the edge flow boundary are in the filter kernel of the edge flow-directed filter except on the central point.

14. The deblocking apparatus of claim 13, wherein weights of the filter kernel used to perform the average filtering using kernel matrix K1 and the weighted average filtering using kernel matrix K2 are calculated as:

Kernel(x,y)=K1(x,y)·$\vec{F}$(x,y)|·|$\vec{F}$(1,1)|·{1+ cos [angle($\vec{F}$(x,y))−angle($\vec{F}$(1,1))]} wherein an edge flow matrix covered by the filter kernel is $\vec{F}$(x,y), 0≦x,y≦2, $\vec{F}$(1,1) is the center point of the matrix, angle($\vec{F}$(x,y)) is the angle of vector $\vec{F}$(x,y), and kernel matrix K1 and K2 are given by $$K1 = \begin{bmatrix} 0.5 & 1 & 0.5 \\ 1 & 2 & 1 \\ 0.5 & 1 & 0.5 \end{bmatrix} \text{ and } K2 = \begin{bmatrix} 0 & 1 & 0 \\ 1 & 4 & 1 \\ 0 & 1 & 0 \end{bmatrix}.$$

15. The deblocking apparatus of claim 11, wherein the edge pixel location determiner determines a location of the edge pixel on the edge flow boundary only relating to a first scale highpass wavelet image among the compressed images transformed by the wavelet transformer.

16. The deblocking apparatus of claim 11, wherein the curvelet transformer includes:
  an image analyzer decomposing an image including the filtered wavelet image and un-filtered wavelet images in subbands;
  a subband divider dividing each of the subbands into suitable scale blocks;
  a renormalizer renormalizing the divided blocks as unit scale blocks;
  a ridgelet transformer performing a discrete ridgelet transform analyzing each block; and
  curvelet coefficient estimator estimating an original image before being BDCT compressed.

17. The deblocking apparatus of claim 16, wherein the curvelet coefficient estimator estimates the original image before being BDCT compressed using the following hard-thresholding rule, $\hat{d}$=d If |d|≧T, $\hat{d}$=0 If |d|<T, and T=$\lambda_1^j$·$\lambda_2^j$·$T_w^j$, wherein d is the noisy curvelet coefficients, $\lambda_1^j$ is related to quantization matrix and $\lambda_2^j$ is the coefficient which is mainly determined by a size of the following blocking ridgelet transform, $$T_j^w = \left[\sum_{(x,y)\in C}\sum\left(|W_{2j}^1 f|^2 + |W_{2j}^2 f|^2\right)\right] / (N_w \times N \times N),$$

and wherein C={(x,y)|E(x,y)=1} and $N_w$ is defined as the number of non-zero elements in E(x,y).

18. The deblocking apparatus of claim 16, wherein the blocks overlap between two vertically adjacent blocks.

19. The deblocking apparatus of claim 16, further comprising:
  an inverse curvelet transformer performing an inverse curvelet transform on the original image before being BDCT compressed which is estimated by the curvelet coefficient estimator.

20. A computer-readable storage medium encoded with processing instructions for causing a processor to perform a method of deblocking using an edge flow-directed filter and curvelet transform, the method comprising:
  extracting an edge flow vector from a Block Discrete Cosine Transform (BDCT) compressed image to identify a direction of changes in image attributes;
  performing a dyadic discrete wavelet transform on the BDCT compressed image;
  selectively filtering a highpass wavelet image among dyadic discrete wavelet transform compressed images according to an edge flow direction of an edge pixel;
  performing a curvelet transform on an image including the selectively filtered highpass wavelet image and wavelet images other than the highpass wavelet image; and estimating an original image before being BDCT compressed using the curvelet transform.

* * * * *

UNITED STATES PATENT AND TRADEMARK OFFICE
CERTIFICATE OF CORRECTION

PATENT NO. : 7,403,665 B2
APPLICATION NO. : 11/159116
DATED : July 22, 2008
INVENTOR(S) : Zhi-ming Zhang It is certified that error appears in the above-identified patent and that said Letters Patent is hereby corrected as shown below:

Column 8, Line 53, change "unfiltered" to --un-filtered--.

Signed and Sealed this

Eighteenth Day of November, 2008

JON W. DUDAS
*Director of the United States Patent and Trademark Office*